United States Patent
Gullicksen

(10) Patent No.: US 10,444,320 B2
(45) Date of Patent: Oct. 15, 2019

(54) LOCATING DEVICES BASED ON ANTENNA COORDINATES

(71) Applicant: Gullicksen Brothers, LLC, Campbell, CA (US)

(72) Inventor: Jeff Gullicksen, Mountain View, CA (US)

(73) Assignee: Reavire, Inc., Campbell, CA (US)

( * ) Notice: Subject to any disclaimer, the term of this patent is extended or adjusted under 35 U.S.C. 154(b) by 32 days.

(21) Appl. No.: 15/727,103

(22) Filed: Oct. 6, 2017

(65) Prior Publication Data

US 2018/0100916 A1    Apr. 12, 2018

Related U.S. Application Data

(60) Provisional application No. 62/516,468, filed on Jun. 7, 2017, provisional application No. 62/404,948, filed on Oct. 6, 2016.

(51) Int. Cl.
*G01S 5/02* (2010.01)
*G01S 5/08* (2006.01)

(52) U.S. Cl.
CPC .......... *G01S 5/0289* (2013.01); *G01S 5/0226* (2013.01); *G01S 5/0252* (2013.01); *G01S 5/0263* (2013.01);
(Continued)

(58) Field of Classification Search
CPC .... G01S 5/0289; G01S 5/0273; G01S 5/0252; G01S 5/08; G01S 5/0263
See application file for complete search history.

(56) References Cited

U.S. PATENT DOCUMENTS

| 5,917,449 A * | 6/1999 | Sanderford ............. G01S 1/022 342/457 |
| 6,249,680 B1 | 6/2001 | Wax et al. |

(Continued)

FOREIGN PATENT DOCUMENTS

| CN | 104902564 | 9/2015 |
| KR | 1020160000873 | 1/2016 |

(Continued)

OTHER PUBLICATIONS

"Best room-scale games for the HTC Vive", Jul. 25, 2017, 9 pages. https://www.vrheads.com/best-room-scale-games-htc-vive.

(Continued)

*Primary Examiner* — Ayodeji O Ayotunde
(74) *Attorney, Agent, or Firm* — BainwoodHuang

(57) ABSTRACT

A technique for locating devices detects wireless packets using multiple antenna units and generates antenna coordinates in an antenna coordinate system on a per-packet basis. Information about antenna coordinates are stored in entries of a data store. Packets originating from different locations produce different antenna coordinates, enabling antenna coordinates to differentiate regions in physical space. Although antenna coordinates do not directly describe physical locations, they are stable over time given a stable environment and thus allow determination as to whether a location has been visited before. Entries in the data store may store Cartesian (physical) coordinates associated with respective antenna coordinates, enabling real-time tracking of physical device locations by lookups into the data store based on antenna coordinates.

28 Claims, 11 Drawing Sheets

(52) U.S. Cl.
CPC .......... *G01S 5/0273* (2013.01); *G01S 5/0294* (2013.01); *G01S 5/08* (2013.01)

(56) References Cited

U.S. PATENT DOCUMENTS

| | | | |
|---|---|---|---|
| 7,692,532 | B2 | 4/2010 | Fischer et al. |
| 8,150,384 | B2 | 4/2012 | Abifaker et al. |
| 9,001,120 | B2 | 4/2015 | Steedly et al. |
| 9,001,129 | B2 | 4/2015 | Rhee et al. |
| 9,041,622 | B2 | 5/2015 | McCulloch et al. |
| 9,084,217 | B2 | 7/2015 | Wax et al. |
| 9,288,632 | B2 | 3/2016 | Yang et al. |
| 9,516,503 | B2 | 12/2016 | Berns et al. |
| 9,843,772 | B2 | 12/2017 | Lee et al. |
| 2004/0080412 | A1 | 4/2004 | Smith et al. |
| 2006/0022815 | A1* | 2/2006 | Fischer ............ G06K 7/0008 340/505 |
| 2006/0143292 | A1 | 6/2006 | Taubenheim et al. |
| 2013/0172007 | A1* | 7/2013 | Wax ............ H04W 64/00 455/456.1 |
| 2013/0244684 | A1 | 9/2013 | Kadous et al. |
| 2014/0295878 | A1* | 10/2014 | Yang ............ G01S 5/0252 455/456.1 |
| 2016/0026253 | A1 | 1/2016 | Bradski et al. |

FOREIGN PATENT DOCUMENTS

| | | |
|---|---|---|
| WO | 2013028908 | 2/2013 |
| WO | 2013/075125 | 5/2013 |

OTHER PUBLICATIONS

"Hololens Inside-out Tracking Is Game Changing for AR & VR, and No One Is Talking about it", Sep. 20, 2016, 4 pages. https://www.roadtovr.com/microsoft-hololens-inside-out-tracking-augmented-reality-virtual-reality-ar-vr/.

"Oculus Rift Officially Brings Room Scale to the VR Platform", May 26, 2017, 4 pages. https://www.gamespot.com/articles/oculus-rift-officially-brings-room-scale-to-the-vr/1100-6450377.

"Shared experiences in mixed reality", Mar. 21, 2018, 7 pages. https://developer.microsoft.com/en-us/windows/mixed-reality/shared_experiences_in_mixed_reality.

"Virtual reality", Wikipedia, Apr. 22, 2018, 14 pages. https://en.wikipedia.org/wiki/Virtual_reality.

International Application No. PCT/US2017/055582 International Search Report and Written Opinion including PCT/ISA/220, PCT/ISA/210, and PCT/ISA/237 to Gullicksen Brothers, LLC, dated Jan. 22, 2018, 17 pages.

Li Bing et al: CSI-Based WiFi-Inertial State Estimation; 2016 IEEE International Conference on Multisensor Fusion and Integration for Intelligent Systems (MFI), IEEE, Sep. 19, 2016, pp. 245-250.

"Mist Systems: Wi-Fi Assurance and BLE Location Services", 2018, 6 pages. https://www.mist.com/services/#enterprise-grade-ble.

"Decimeter-Level Localization with a Single WiFi Access Point", Mar. 16-18, 2016, 15 pages. https://www.usenix.org/system/files/conference/nsdi16/nsdi16-paper-vasisht.pdf.

"SpotFi: Decimeter Level Localization Using WiFi", Aug. 17-21, 2015, 14 pages. https://web.stanford.edu/~skatti/pubs/sigcomm15-spotfi.pdf.

* cited by examiner

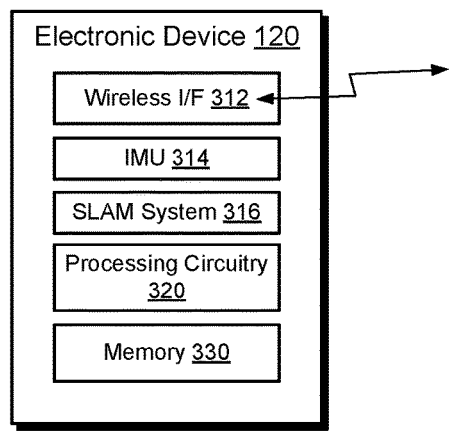
FIG. 3
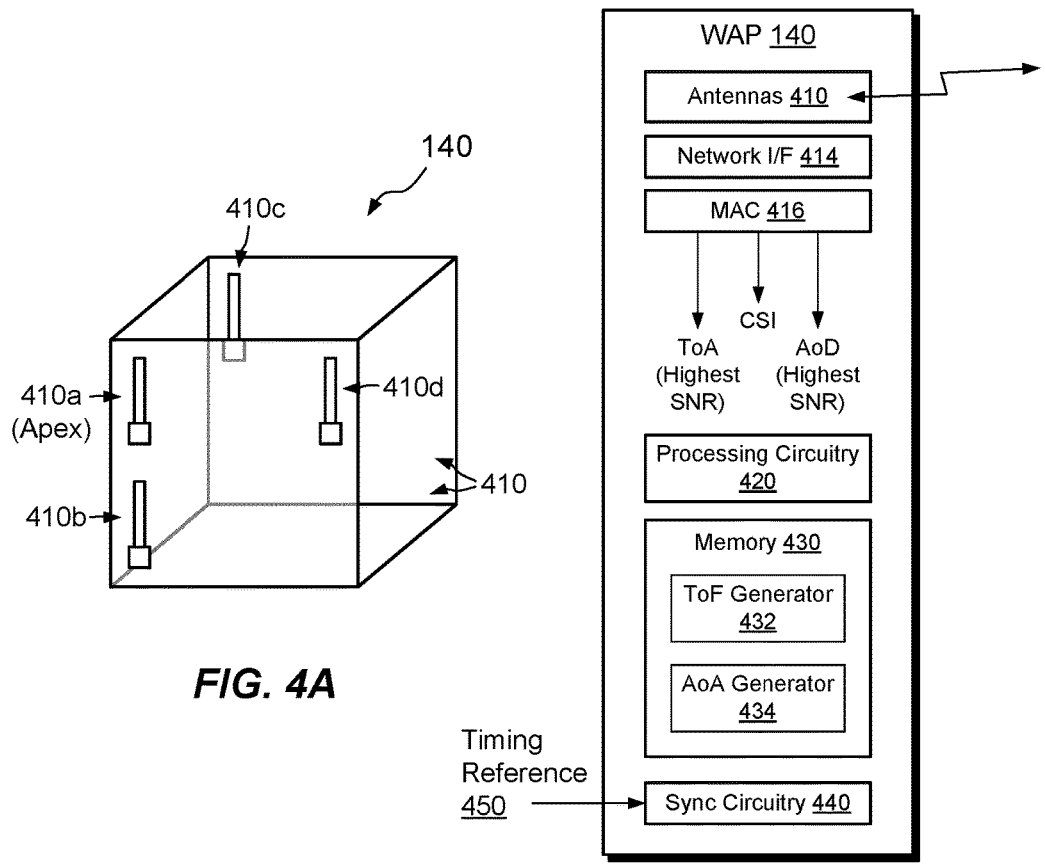
FIG. 4A
FIG. 4B

| |
|---|
| Measured Centroid 710 |
| Measured Running Avg Count 712 |
| IMU Centroid 720 |
| IMU Running Avg Count 722 |
| SLAM Centroid 730 |
| SLAM Running Avg Count 732 |
| Learning Value 740 |
| Last Learn Time 750 |
| Last Age Time 760 |
| Block of Adjacency Pointers 770 (Estimate at 30) |
| Adjacency Block Pointer 780 |
← 640
*FIG. 7*
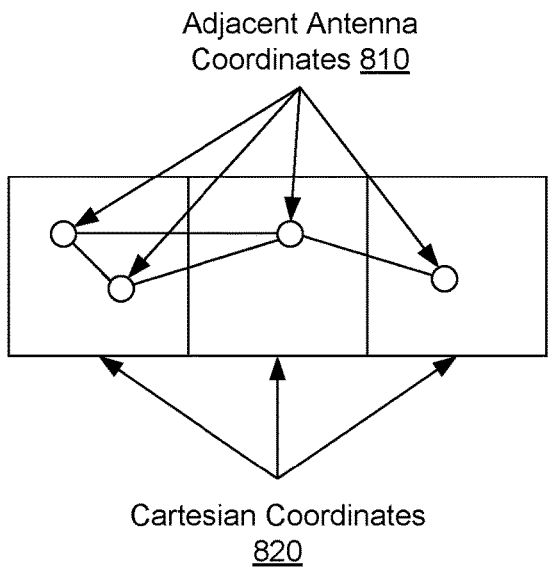
*FIG. 8*
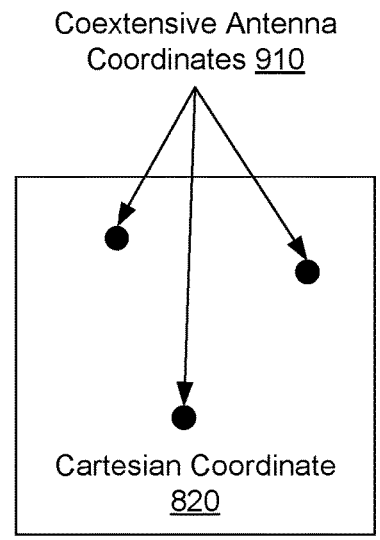
*FIG. 9*

LOCATING DEVICES BASED ON ANTENNA COORDINATES

CROSS-REFERENCES TO RELATED APPLICATIONS

Benefit is claimed to U.S. Provisional Application No. 62/404,948, filed Oct. 6, 2016, and to U.S. Provisional Application No. 62/516,468, filed Jun. 7, 2017. The contents and teachings of these prior applications are incorporated by reference herein in their entirety.

BACKGROUND OF THE INVENTION

Field of the Invention

This invention relates generally to wireless communications, and, more particularly, to tracking locations of wireless devices in a physical space.

Description of Related Art

The Global Positioning System (GPS) has become the basis for a wide variety of applications requiring location services. Such services are commonly used in applications for mapping, such as Google Maps and Apple Maps, in applications that provide location-specific content, such as shopping sites and news sites, and in authentication, where device locations may provide authentication factors.

As GPS is often ineffective indoors, a number of Indoor Positioning Systems (IPS) have also been developed. Such systems may employ radio waves, magnetic fields, acoustic signals, or other sensory information for locating devices. Some IPS arrangements are based on Wi-Fi and locate devices using received signal strength or other signal characteristics.

SUMMARY

Unfortunately, existing IPS solutions are generally slow to locate devices and produce location measurements whose accuracy is on the order of meters. Nevertheless, many developing technologies could benefit from fast and accurate positioning systems that work both indoors and outdoors. Examples of such technologies include VR (virtual reality) and AR (augmented reality) applications, such as games, where it is desirable to track body movements of players at high speed, and security applications, where detections of finely-resolved locations may be used to authenticate user rights.

In contrast with existing positioning systems, an improved technique for locating devices both indoors and outdoors detects wireless packets using multiple antenna units and generates antenna coordinates in an antenna coordinate system on a per-packet basis. Information about antenna coordinates are stored in entries of a data store. Packets originating from different locations produce different antenna coordinates, enabling antenna coordinates to differentiate regions in physical space. Although antenna coordinates do not directly describe physical locations, they are stable over time given a stable environment and thus enable quick and efficient determination as to whether a location has been visited before. For example, the technique may generate an antenna coordinate for a location, based on a packet emitted from that location, and may check whether an entry already exists for that antenna coordinate in the data store. The existence of a valid entry confirms that the location has been visited before. In addition, entries in the data store may store Cartesian (physical) coordinates associated with respective antenna coordinates, enabling fast, real-time tracking of physical device locations by simple lookups into the data store based on antenna coordinates.

Advantageously, the improved technique greatly simplifies the task of tracking packet-emitting devices by matching newly produced antenna coordinates with antenna coordinates previously added to the data store. Such matching greatly relieves processors of the computational burdens normally associated with locating devices. The reduced computational burdens bring particular benefits to systems that track multiple devices in real time, such as gaming systems in which players use packet-emitting wearable devices to track their body and/or limb positions.

In some examples, antenna coordinates are formed as an ordered set of coordinate components, where each coordinate component is derived from data of a particular antenna unit or provided directly by that antenna unit.

According to some variants, each coordinate component is an integer, such that antenna coordinates are represented as ordered sets of integers.

According to some variants, the data store organizes entries for antenna coordinates in a multi-dimensional array, with each antenna coordinate providing a multi-dimensional index into the array.

In some examples, the technique derives each coordinate component from timing data produced by a respective antenna unit in response to receipt of a packet. The timing data may describe a spatial invariant, i.e., a consistent feature of the physical space in response to a packet emitted from the source location, such as a time-of-arrival of the packet and/or a time-of-flight of the packet.

According to some examples, the spatial invariant is provided as a mixed time-of-flight of the packet based on a multi-path propagation of the packet in the physical space.

In some examples, the technique generates the mixed time-of-flight based on phase information obtained across multiple Wi-Fi sub-channels as provided in CSI (channel state information) from the antenna unit. For example, the mixed time-of-flight provides an integer value representing the slope of a line that relates Wi-Fi sub-channels to unwrapped CSI phase.

According to some variants, generating the mixed time-of-flight includes correcting a frequency offset error for the packet from time-of-flight measurements. The technique may synchronize all antenna units to a common frequency reference and analyze differences in path lengths across antenna units to identify and remove a frequency offset error.

In some examples, antenna units are realized as WAPs (wireless access points) each including at least four antennas. According to some variants, the four antennas are arranged at corners of a cube, with one antenna (the "apex" antenna) placed adjacent to the other three. In such variants, mixed time-of-flight may be based on a single antenna, such as the apex antenna, with all antennas together providing a mixed angle-of-arrival of the packet.

According to some variants, the technique combines mixed angle-of-arrival from the different WAPs to produce a fingerprint of the packet. The technique may store the fingerprint in the entry for the corresponding antenna coordinate in the data store. In some examples, multiple regions in Cartesian space map to the same antenna coordinate. In such cases, the fingerprint uniquely distinguishes regions in antenna coordinate space. For example, fingerprints enable regions to be uniquely identified in three-dimensional physical space using only three WAPs.

In some examples, the improved technique trains Cartesian coordinates to corresponding antenna coordinates based on repeated measurements. For example, entries in the data store represent Cartesian coordinates as centroids, where each centroid provides an average of Cartesian coordinates over multiple measurements. For example, a device that emits a packet may also provide, at the same time the device emits the packet or nearly so, its Cartesian coordinate based on an IMU (inertial measurement unit) or a SLAM (simultaneous localization and mapping) system operating on the device. In some examples, the technique may compute a Cartesian coordinate based on information captured by the antenna units when receiving the packet. These may include geometrical methods based on time-of-arrival, angle-of-arrival, and/or other methods. Each time a Cartesian coordinate is received (or computed) and correlated with an antenna coordinate, the centroid stored in the entry for the antenna coordinate may be updated to reflect the new information, with the precision of the centroid improving upon each update.

In some examples, the improved technique tracks paths of moving devices based on locator packets emitted by the devices. As used herein, a "locator packet" is a wireless packet sent by a device to initiate a measurement of that device's antenna coordinate. Although the antenna coordinate system is not necessarily smooth, such that antenna coordinates with adjacent indices do not always correspond to adjacent physical regions, the act of tracking devices as they move enables the technique to definitively identify physically adjacent antenna coordinates. In an example, the data store maintains a list of adjacencies for an antenna coordinate in the entry for that antenna coordinate.

In some examples, antenna coordinates are aged out over time to enable adaptations to changes in the physical space, such as rearrangements of furniture and other geometrical changes. When an antenna coordinate is aged out, its entry is removed from the data store. In some examples, the aged-out antenna coordinate is also removed from any list of adjacencies in entries for adjacent antenna coordinates.

In some examples, the same Cartesian coordinate may map to different antenna coordinates in the data store, even when fingerprints are used, e.g., because of a recent change in the geometry of the physical space. In such cases, the technique maintains a list of antenna coordinates for a particular Cartesian coordinate. Each time one of the antenna coordinates on the list for that Cartesian coordinate is "visited," i.e., each time a packet is received that produces that antenna coordinate, each of the other antenna coordinates on the list for that Cartesian coordinate is aged out by a predetermined amount, thereby enabling the technique to adapt quickly to environmental changes.

In some examples, participating devices used in accordance with the improved technique are configured to transmit locator packets over a particular Wi-Fi channel, and to transmit other packets over one or more other Wi-Fi channels.

In some examples, participating devices are configured to transmit locator packets relative to a common period. Packet retry time on participating devices is set to a value between the locator packet transmission time and the common period. In some variants, packet retry time is selected as a random value between these limits. With these settings, locator packets from different devices tend to self-channelize. For example, if any device detects a collision, it will retry shortly thereafter. Over time, each device tends to settle on a particular time relative to the common period for sending its locator packets, and most collisions are avoided going forward.

In some examples, the technique employs a base station operatively connected to the antenna units. According to some variants, the technique accommodates installations covering large physical spaces by providing multiple base stations securely networked together. In such arrangements, each base station is associated with its own respective set of antenna units. Each base station may maintain its own data store, or data stores may be merged.

In some examples, the system includes an arbitrarily large number of antenna units and a single base station. The base station selects a particular set of antenna units (typically three) to use in generating each antenna coordinate. For example, each antenna unit that receives a packet transmits its coordinate component (or data from which the coordinate component may be derived) to the base station. The base station maintains a predetermined priority ordering of antenna units, and selects the highest priority antenna units, from among the antenna units that provide coordinate components in response to the packet, when generating the antenna coordinate.

Certain embodiments are directed to a method of locating electronic devices in a physical space. The method includes generating multiple antenna coordinates based on receipt of wireless packets by a system that includes multiple antenna units, each antenna coordinate representing a region in a multi-dimensional antenna coordinate system. The method further includes storing an entry for each antenna coordinate in a data store. Each entry associates a respective antenna coordinate with information about that antenna coordinate. The information includes, for one or more of the entries, a Cartesian coordinate that maps to the respective antenna coordinate. In response to the antenna units receiving a new wireless packet, the method further includes (i) generating a current antenna coordinate for the new wireless packet, (ii) accessing a matching entry in the data store, the matching entry storing information about the current antenna coordinate, and (iii) providing a Cartesian coordinate stored in the matching entry as a source location of the new wireless packet. The method thereby identifies Cartesian coordinates of sources of wireless packets based on matching of antenna coordinates.

Other embodiments are directed to an electronic system constructed and arranged to locate electronic devices in a physical space, such as the method described above. Still other embodiments are directed to a computer program product. The computer program product includes a set of non-transient, computer-readable media that store instructions which, when executed by control circuitry of an electronic system, cause the electronic system to perform a method of locating electronic devices in a physical space.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale, emphasis instead being placed upon illustrating the principles of various embodiments.

FIG. 3 is a block diagram of an example electronic device of FIG. 1.

FIGS. 4A and 4B are (A) an isometric view showing antenna placement in a WAP (wireless access point) and (B) a block diagram showing example electronic components of a WAP.

FIG. 7 is a diagram of an example data field as may be found in an entry for an antenna coordinate.

FIG. 8 shows multiple regions occupied by respective Cartesian coordinates, which include adjacent antenna coordinates.

FIG. 9 shows an example region occupied by a Cartesian coordinate, which contains multiple coextensive antenna coordinates.

DETAILED DESCRIPTION OF THE INVENTION

Embodiments of the invention will now be described. One should appreciate that such embodiments are provided by way of example to illustrate certain features and principles of the invention but that the invention hereof is not limited to the particular embodiments described.

An improved technique for locating devices detects wireless packets using multiple antenna units and generates antenna coordinates in an antenna coordinate system on a per-packet basis. Entries in a data store associate antenna coordinates with Cartesian (physical) coordinates, enabling fast, real-time tracking of physical device locations by simple lookups into the data store based on antenna coordinates.

Unlike a Cartesian coordinate system, which is smooth and continuous, the proposed antenna coordinate system may be unsmooth and subject to reflection, refraction, diffraction, and dispersion. Regions that are adjacent in Cartesian space are not necessarily adjacent in antenna space, and vice-versa. Thus, antenna coordinates, by themselves, cannot normally be relied upon to identify locations of packet-emitting devices. However, antenna coordinates are consistent over time and variable over space, such that they can be used to distinguish physical regions in space. Antenna coordinates may thus be relied upon definitively to answer the question, "Have I been here before?" Embodiments as disclosed herein combine the consistency of antenna coordinates with the certainty of Cartesian coordinates to yield a fast and accurate technique for identifying device locations and for tracking devices as they move through space.

Figure 1:
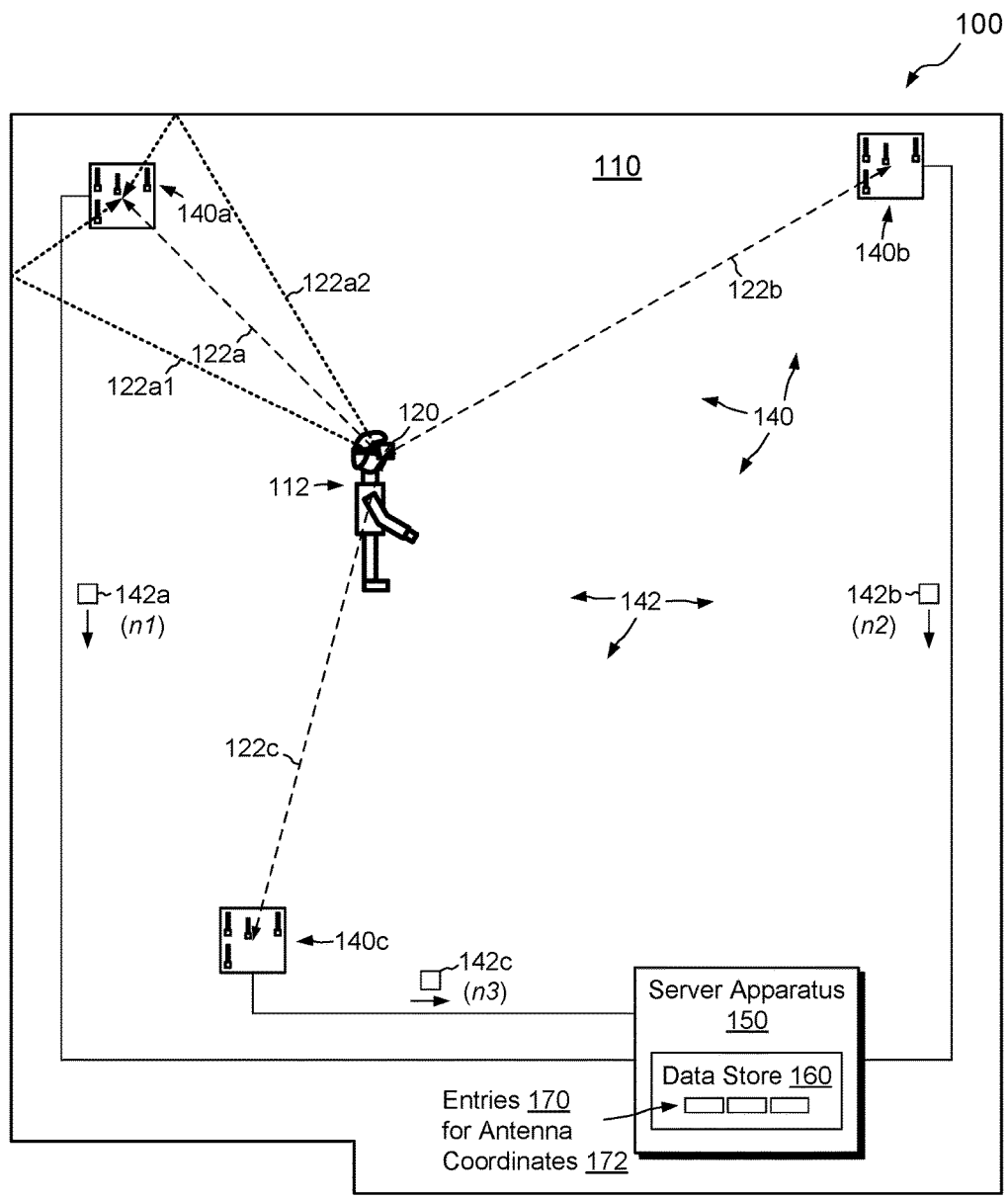
FIG. 1 is a top, plan view of an example environment in which embodiments of the improved technique hereof can be practiced.

FIG. 1 shows an example environment 100 in which embodiments of the improved technique can be practiced. Here, a physical space 110 is provided in which a user 112 operates an electronic device 120, shown as an AR (augmented reality) headset. The device 120 may be any wireless-packet-emitting device, such as a cell phone, tablet, PDA (personal data assistant), laptop, wearable sensor, or the like. Multiple antenna units 140 are placed around the physical space 110 in stable locations. The antenna units 140 may be fixed to walls, ceilings, floors, etc., and/or may be placed in locations where they are unlikely to be disturbed. Three antenna units 140a, 140b, and 140c are specifically shown, and additional antenna units 140 may be provided. The physical space 110 may be wholly indoors, wholly outdoors, or may include both indoor and outdoor regions.

A server apparatus 150 operatively connects to the antenna units 140 using wires or wirelessly. The server apparatus 150 includes a data store 160, which has entries 170 that store information about respective antenna coordinates 172. The information stored in each entry 170 may include a Cartesian coordinate associated with the respective antenna coordinate 172, as well as other information. The Cartesian coordinate may be acquired in any suitable way, such as by receiving IMU (inertial measurement unit) output from an emitting device coincidently with that device sending a packet, by receiving SLAM (simultaneous localization and mapping) measurements from the emitting device coincidently with that device sending a packet, by computations of device location based on antenna measurements, or in any other manner that measures the device's physical location at or around the time the device emits the packet used to generate the antenna coordinate 172. In addition, Cartesian coordinates may be averaged, to reflect multiple visits to a particular region of an antenna coordinate, such that accuracy of the Cartesian coordinate improves over time.

In example operation, the user 112 moves around the physical space 110 and the device 120 emits wireless packets, such as Wi-Fi packets. The packets travel through the physical space 110, e.g., via paths 122a, 122b, and 122c, and encounter respective antenna units 140a, 140b, and 140c. The antenna units 140 detect the packets, generate respective timing information 142a, 142b, and 142c, and send the timing information to the base station 150. The base station 150 receives the timing information 142 and generates antenna coordinates 172. For antenna coordinates that have not been visited before, e.g., for which the data store 160 includes no entries 170, the server apparatus 150 may create new entries for those antenna coordinates. For antenna coordinates that have been visited before, the server apparatus 150 may update the corresponding entries to reflect each new visit.

Operation proceeds on a per-packet basis. Timing information 142 may pertain to one particular packet at a time and/or may include packet identifiers, which enable the base station 150 to correlate timing information across antenna units 140 based on packet. The timing information 142 from each antenna unit 140 reflects information about the packet from that antenna unit's own point of view.

In an example, the timing information 142 provides a "spatial invariant" of the emitting location of the device 120 in the physical space 110. The spatial invariant provides a type of signature whose characteristics are highly specific to the emitting location and physical space 110. Examples of spatial invariants may include time-difference-of-arrival (TDoA) and time-of-flight (ToF). In a particular example, the spatial invariant is provided as a "mixed ToF," which is based on CSI (channel state information) from the antenna units 140. Unlike customary ToF measurements, which attempt to measure flight times along direct paths (e.g., paths 122*a*, 122*b*, and 122*c*), mixed ToF is based on multiple paths and includes content arising from reflections, refraction, diffraction, and dispersion. As shown in FIG. 1, for example, mixed ToF would be based not only on direct path 122*a*, but also on reflected paths 122*a*1 and 122*a*2. Indeed, mixed ToF may encompass any number of paths, which may involve reflections off walls, ceilings, floors, furniture, and so forth. In some cases, the direct path may be blocked such that it is highly attenuated or not detected at all. Mixed ToF thus reflects a true signature of the physical space 110 based on a packet emitted from a particular location. As the packet-emitting device moves, the signature and thus the mixed ToF will change, allowing mixed ToF to be used as a strong identifier of emitter location.

In an example, each of the antenna units 140 generates a respective mixed ToF measurement and provides that measurement in the timing data 142. In some examples, the antenna units 140*a*, 140*b*, and 140*c* provide each mixed ToF measurement as an integer, e.g., n1, n2, and n3, respectively, and the server apparatus 150 applies the integers as antenna coordinate components, such that each antenna coordinate AC is formed as an ordered set of coordinate components, e.g., $$AC=(n1,n2,n3).$$

The data store 170 may arrange antenna coordinates in an array, with the antenna coordinates providing indices into the array. In some examples, the server apparatus 150 receives the timing data 142 in non-integer form, or as a precursor to mixed ToF, and performs computations to render the timing data 142 as integers reflecting mixed ToF.

Once the server apparatus 150 has stored one or more antenna coordinates 172 in the data store 160, the server apparatus 150 may compare later-generated antenna coordinates 172 to those in the data store 160 to determine whether there is a match. For example, the server apparatus 150 may generate a new antenna coordinate 172 in response to the antenna units 140 detecting a packet. The server apparatus 150 may then perform a look-up in the data store for the matching antenna coordinate, e.g., by checking whether an entry is present at the array indices (n1, n2, n3). If a match is found, the Cartesian coordinate stored in the matching entry may be returned as the location of the emitting device. If no match is found, the server apparatus 150 may create a new entry 170 for the new antenna coordinate 172.

Figure 2:
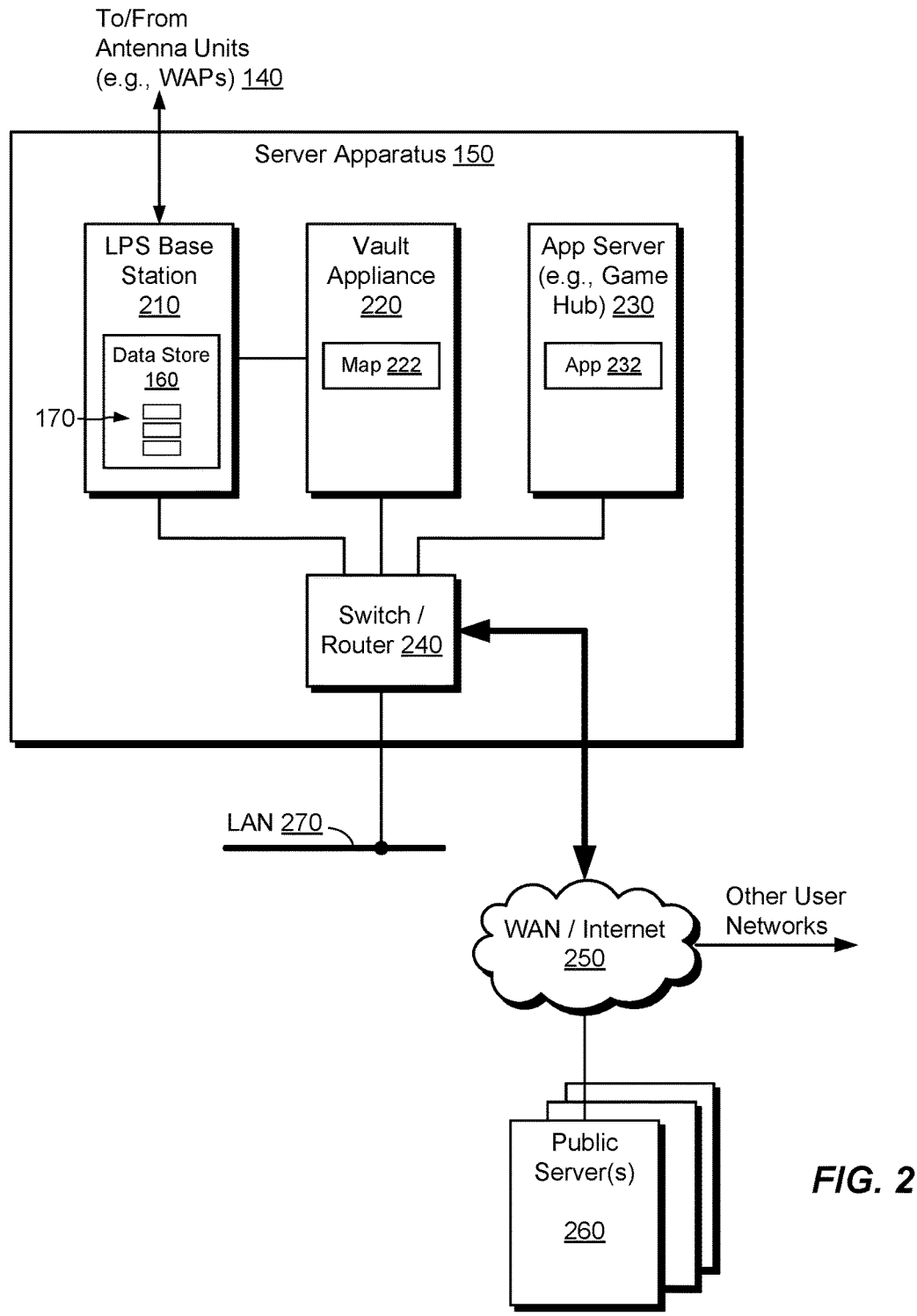
FIG. 2 is a block diagram showing an example server apparatus of FIG. 1.

FIG. 2 shows an example of the server apparatus 150 and related components in additional detail. Here, the server apparatus 150 includes an LPS (local positioning service) base station 210, a vault appliance 220, an application server 230, and a switch/router 240. In various examples, these components may be provided separately, as a single integrated unit, or as any combination of physical units.

The LPS base station 210 is configured to receive timing data 142 from antenna units 140, generate antenna coordinates 172, and store antenna coordinates 172 in entries 170 of the data store 160. The LPS base station 210 is further configured to perform look-ups into the data store 160 on antenna coordinates 172 and to return associated Cartesian coordinates. The LPS base station 210 may be configured to perform still further activities, such as training Cartesian coordinates to associated antenna coordinates 172. As will be described, training may involve strengthening certain associations and weakening others. In some examples, training further involves tracking "coextensive realities," i.e., instances where the data store 150 maps a single Cartesian coordinate to multiple antenna coordinates 172. In some examples, the LPS base station 210 includes circuitry for generating a common timing reference (not shown), which may be used to synchronize antenna units 140. Further details of location measurement using antennas and an LPS base station 210 may be found in U.S. patent application Ser. No. 15/452,451, filed Mar. 7, 2017 and entitled "CONTROLLING ACCESS TO A COMPUTER NETWORK USING MEASURED DEVICE LOCATION," the contents and teachings of which are incorporated herein by reference.

The vault appliance 220 is a secure hub for storing and dispatching rights. Such rights may include content rights for accessing particular content, communication rights for establishing communications with another party, and action rights for performing actions on particular devices or elements. For example, the vault appliance 220 may securely store the map data 160, or portions thereof, and may securely control the release of such map data 160 using content rights and/or communication rights. Further details about the vault appliance 220 may be found in U.S. patent application Ser. No. 15/347,551, filed Nov. 9, 2016 and entitled "VAULT APPLIANCE FOR IDENTITY VERIFICATION AND SECURE DISPATCH OF RIGHTS," the contents and teachings of which are incorporated herein by reference.

The application server 230 is a computerized device configured to run software applications, such as an application 232. The application server 230 may be implemented as a general purpose computer or as a specialized system, such as a game hub. The game hub may be similar to conventional game consoles (e.g., X-BOX, PlayStation, etc.) but is adapted to work with MR (mixed reality) games which track locations of user devices. In the conventional way, the game hub may download games and other content over the Internet. It may also receive content via conventional software media, DVDs, Blu-ray disks, etc.

Features of the LPS base station 210 and application server 230 promote security and provide other benefits, but their particular details should be regarded as optional unless otherwise specified.

The switch/router 240 may have a conventional design. For example, the switch/router 240 has LAN (Local Area Network) ports for connecting to the LPS base station 210, vault appliance 220, and application server 230, as well as for distributing a wired LAN 270 throughout the physical space 110. The switch/router 240 may also have a WAN (Wide Area Network) port, for connecting to a WAN/Internet 250. In some examples, the switch/router 240 is a wired device only, with wireless services performed by the LPS base station 210, e.g., using one or more of the antenna units. In other examples, the switch/router 240 directly supports both wired and wireless communications.

Using the WAN port, the switch/router 240 may connect to one or more public servers 260. These may include online stores (e.g., for buying games) and various servers to support vault-based communications. The switch/router 240 also supports communication over the WAN/Internet 250 with similarly-configured networks of other users, e.g., to support multi-player games or other applications across different local networks and locations.

The LPS base station 210, the vault appliance 220, and the application server 230 may each include their own processing circuitry and memory. Each memory may store instructions which, when run by the respective processing circuitry, cause the processing circuitry to carry out various procedures and activities as may be described herein. Unless otherwise specified, one should appreciate that any activities ascribed to the server apparatus 150 may be performed by any of the included components, or by any combination of such components.

FIG. 3 shows an example electronic device 120 in additional detail. The depiction of FIG. 3 is intended to be representative of electronic devices in general, even though such devices 120 may vary greatly in their design and uses. Here, electronic device 120 includes a wireless interface 312, such as a Wi-Fi adapter, an IMU (inertial measurement unit) 314, a SLAM (simultaneous localization and mapping) system 316, processing circuitry 320, and memory 330. The IMU 314 and accompanying software generate Cartesian location and orientation measurements using accelerometers and/or magnetometers. The SLAM system 316 and accompanying software use one or more cameras and mapping information to generate Cartesian location and orientation. The software in each case may reside in the memory 330 and be executed by the processing circuitry 320. IMUs and SLAM systems are known in the art. Some embodiments of the electronic device 120 may exclude the IMU 314 and/or SLAM system 316. Thus, these components should not be regarded as required, although they are helpful in locating the device 120 in Cartesian space. For example, device 120 may emit a wireless packet, which serves as the basis for generating an antenna coordinate 172. At the same time, or nearly so (e.g., within 50 ms), device 120 may send a set of packets containing IMU or SLAM data that identifies the device's Cartesian coordinate. In some cases, the device 120 sends IMU or SLAM data in the same packet that is used for generating the antenna coordinate 172.

FIGS. 4A and 4B show respective views of an example antenna unit 140. As shown in FIG. 4A, the antenna unit 140 is a WAP (wireless access point) that includes four antennas 410a-410d. The antennas 410 are oriented in the same direction and are placed at corners of a cube. The "cube" need not be a physical object but rather describes the relative locations of antennas 410. One antenna 410a is designated as an "apex" antenna as it is immediately adjacent to the other three. Any of the antennas 410 on its own may provide the above-described mixed ToF, with the apex antenna 410a chosen by convention for this purpose. The depicted arrangement creates three pairs of antennas 810, with each pair being orthogonal to the other two and allowing measurement of three distinct angle-of-arrival (AoA) values, one AoA value for each antenna pair. The three AoA values may be combined to create a mixed AoA value for the antenna unit, and the antenna units 140 may provide the mixed AoA on a per-packet basis to the server apparatus 150, e.g., in the timing data 142.

The server apparatus 150 may thus receive (or compute) one mixed AoA value for each antenna unit 140 for each packet detected. In an example, the server apparatus 150 combines the mixed AoA values from the respective antenna units 140 for a given packet to generate a "fingerprint," i.e., a distinguishing feature of the antenna coordinate. For example, the server apparatus 150 may generate a fingerprint F of AoA values A1, A2, and A3 as received from antenna units 140a, 140b, and 140c, respectively, as the following ordered set:

$$F=(A1,A2,A3).$$

In some examples, the server apparatus 150 expresses the ordered set F as a three-dimensional vector. Where fingerprints are used, a complete coordinate descriptor may be defined both by the antenna coordinate AC=(n1, n2, n3) and by the fingerprint F. For example, a complete coordinate descriptor CCD may be expressed as follows:

$$CCD=(A1,A2,A3,F).$$

Fingerprints are useful in cases where the system includes only three WAPs. Normally, a system would require four WAPs to unambiguously distinguish physical locations in three-dimensional space. However, a fingerprint provides disambiguating information which enables the system to distinguish locations in three-dimensional space using only three WAPs. As will be described, the server apparatus 150 stores fingerprints in entries 170 for respective antenna coordinates and includes provisions for storing multiple fingerprints in a single entry.

As fingerprints help to disambiguate antenna coordinates, comparison of fingerprints may become part of the process of matching antenna coordinates in real time, for implementations that use fingerprints. For example, when the server apparatus 150 receives coordinate components n1, n2, and n3 and fingerprint components A1, A2, and A3, in response to receipt by the antenna units 140 of a packet, the server apparatus 150 may perform a look-up into the data store 160 to identify a matching antenna coordinate. If a match is found based on the antenna coordinate (n1, n2, n3), then the match is confirmed by comparing fingerprints. For example, the server apparatus 150 compares fingerprints by taking a vector dot-product of a newly generated fingerprint $F_{New}$ with a fingerprint $F_{Old}$ already stored in the matching entry. Fingerprint vectors may be normalized to a length of one. If the vector dot-product $F_{New} \cdot F_{Old}$ is greater than or equal to a threshold value (e.g., 1−e, where e is an error margin), then the vectors $F_{New}$ and $F_{Old}$ align and the match is confirmed. However, if the vector dot-product is less than the threshold, then the vectors do not align and no match is found. If the entry for the matching antenna coordinate includes multiple fingerprints, then the above dot-product testing may be performed for each fingerprint, or until an aligning fingerprint is found. If no match is found, the server apparatus 150 may add the new fingerprint $F_{New}$ to the entry 170.

One should appreciate that fingerprints may be generated in any suitable way, such as by using a variety of measured quantities from antennas 410. Also, while four antennas 410 per WAP provide a robust methodology for generating fingerprints, other numbers of antennas 410 may be used. Thus, it should not be viewed as critical that each WAP 140 include four antennas 410. Further, some commercially-available WAPs include greater than four antennas. Such WAPs may be used herein, with information from additional antennas used for confirmation or not used at all.

FIG. 4B shows example electronic components of a WAP 140, which are seen to include antennas 410, a network interface 414 (e.g., an Ethernet or Wi-Fi adapter), and a MAC (media access controller) 416, as well as processing circuitry 420, memory 430, and synchronization circuitry 440. In an example, the memory 430 "includes," i.e., realizes by execution of software instructions, a ToF generator 432 and an AoA generator 434. The ToF generator 432 is configured to generate the above-described mixed ToF values on a per-packet basis based on CSI. The AoA generator 434 is configured to generate the above-described mixed AoA values on a per-packet basis, e.g., using the antenna pairs described in connection with FIG. 4A. Sync circuitry 440 includes phase-lock loop circuitry for synchronizing the WAP 140 to an external timing reference 450, such as the one described above in connection with the LPS base station 150. As will be described at a later point, synchronization of WAPs to a common timing reference facilitates removal of device frequency offset errors, which may arise when different Wi-Fi devices operate at slightly different center frequencies.

Figure 5:
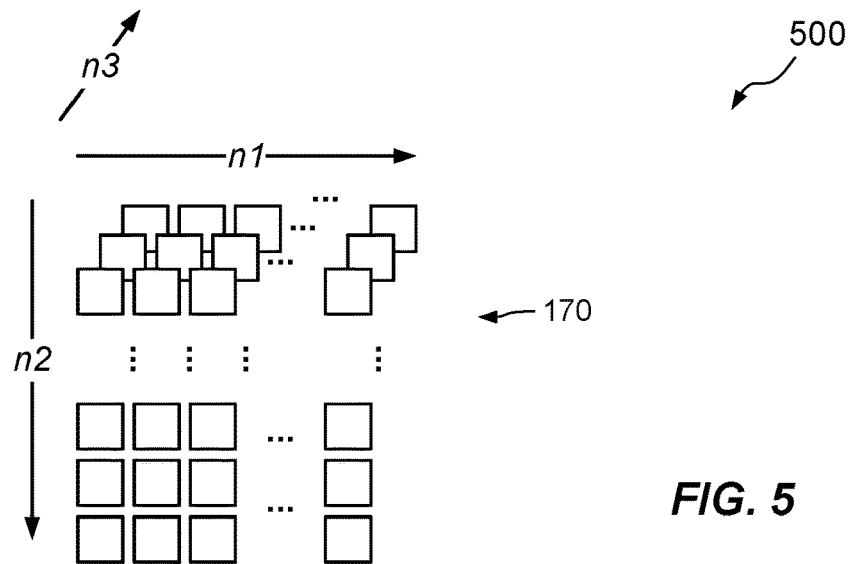
FIG. 5 is a schematic view of an example array for arranging entries for antenna coordinates in a data store.

FIG. 5 shows an example array 500 that the server apparatus 150 may use in storing entries 170 for antenna coordinates 172. As shown, the array 500 is a three-dimensional array. The array 500 has an index for each dimension, where each index is supplied by a respective coordinate component (e.g., n1, n2, or n3). In an example, each coordinate component represents a mixed ToF value from a respective antenna unit (WAP) 140.

Array 500 may be implemented in any suitable way. For example, the array 500 may be provided as a data structure used for implementing arrays in standard programming language. Alternatively, the array 500 may be implemented using a combination of data structures or using custom-designed software. Thus, the particular implementation of the array 500 is not critical.

Figure 6:
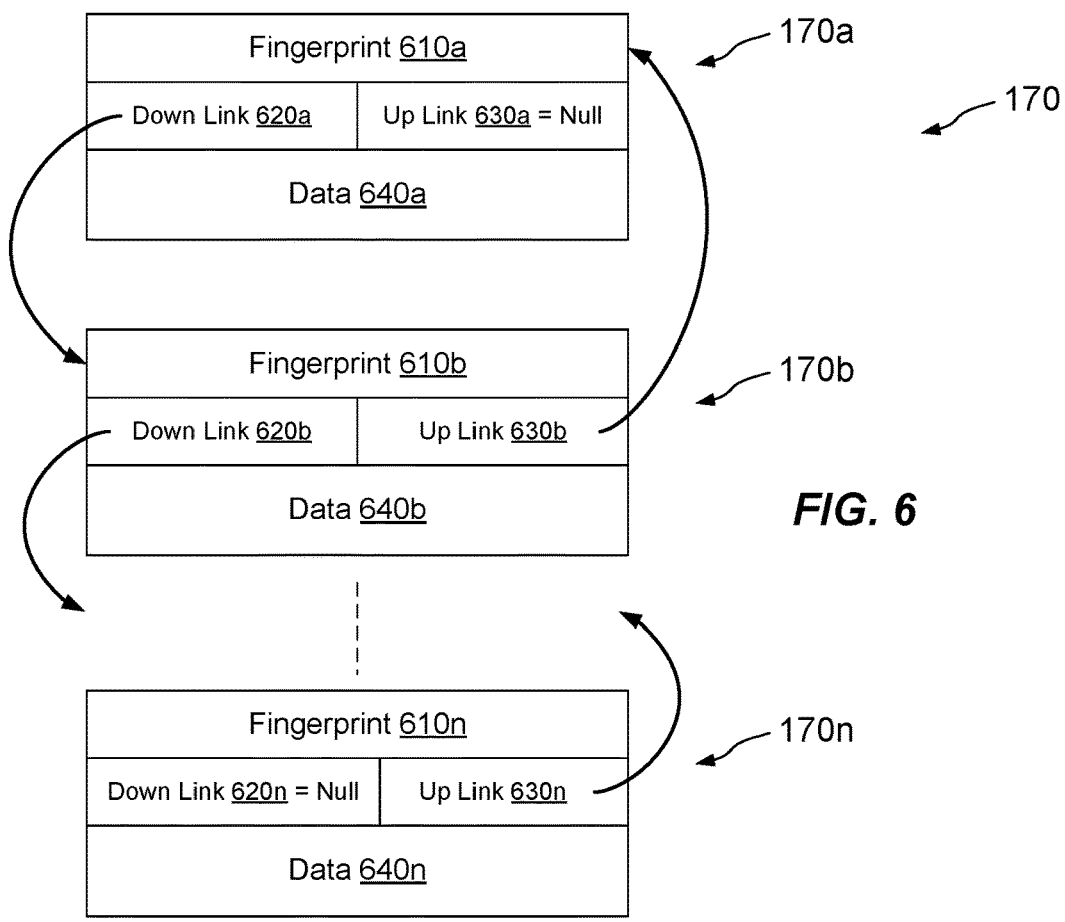
FIG. 6 is a diagram of an entry for an antenna coordinate in the data store.

FIG. 6 shows an example entry 170 in the data store 160. In cases where fingerprints are used, the entry 170 contains a different sub-entry for each unique fingerprint. FIG. 6 shows a total of "n" sub-entries 170a-170n, corresponding to "n" different fingerprints, 610a-610n. The arrangement of FIG. 6 allows for an arbitrary number of fingerprints, to account for multi-path effects and for cases in which the geometrical arrangement of the physical space 110 changes, e.g., in response to furniture being moved, doors being opened and closed, and other changes. In the example shown, sub-entries 170a-170n are arranged in a doubly-linked list, with both down links (620a-620n) and up links (630a-630n) pointing to next and previous sub-entries (or to "Null"). The order of sub-entries 170a-170n is not critical. If the data store 160 removes one sub-entry, e.g., on account of the sub-entry being aged out, the data store 160 may mend the linked list in any suitable manner.

Each of the sub-entries 170a-170n includes respective data 640a-640n. The data in each sub-entry may include a Cartesian coordinate mapped to the antenna coordinate and to the respective fingerprint.

FIG. 7 shows an example data field 640, which is intended to be representative of data fields 640a-640n. In the example shown, the data field 640 includes the following sub-fields:

Measured centroid 710. A centroid of Cartesian coordinates computed based on multiple measurements. For this sub-field, measurements are based on readings from antenna units (WAPs) 140. Measurements for each WAP 140 may include three applications of a joint time of arrival/angle of arrival matrix pencil algorithm and one application of a MUSIC (MUltiple SIgnal Classification) algorithm to get time of flight. The earliest time of arrivals are used to determine direct path, and hence associated angle of arrivals. The shortest time of flight corresponds to the earliest time of arrival. The MUSIC algorithm is performed on the apex antenna and the three matrix pencil algorithms are performed on the three orthogonal antenna pairs, with the apex antenna being common in each pair. Measurements using this approach are computationally intensive and may be used primarily in applications requiring high security, as these types of measurements are difficult to spoof.

Measured running average count 712. A count of measurements that contribute to the measured centroid 710. Incremented each time the antenna coordinate (including fingerprint) is visited and a new measurement is made.

IMU Centroid 720. A separately maintained centroid of Cartesian measurements derived from IMU data and provided by packet-emitting devices at or about the same time the packets are emitted.

IMU running average count 722. A count of IMU measurements that contribute to the IMU centroid 720. Incremented each time the IMU centroid 720 is updated.

SLAM centroid 730. A separately maintained centroid of Cartesian measurements derived from SLAM measurements provided by packet-emitting devices at or about the same time the packets are emitted.

SLAM running average count 732. A count of SLAM measurements that contribute to the SLAM centroid 730. Incremented each time the SLAM centroid 730 is updated.

Learning value 740. A value indicating a strength of association between a Cartesian coordinate and the current antenna coordinate (including fingerprint). Initially set to a value greater than one and incremented by one each time the antenna coordinate (including fingerprint) is visited. Decremented by a predetermined amount on a predetermined schedule, to age out the antenna coordinate over time. May also be decremented under other circumstances. When learning value 740 reaches a predetermined lower limit, such as zero, the antenna coordinate (for the current fingerprint) is deleted. The learning value 740 may apply to all centroids or to a single centroid. Different learning values 740 may be provided for different centroids.

Last learn time 750. A timestamp or other indicator of time that indicates the last time the learning value 740 was incremented. Used to limit the maximum rate at which learning can progress.

Last age time 760. A timestamp or other indicator of time that indicates the last time the learning value 740 was decremented. Used to limit the maximum rate at which aging can proceed.

Block of adjacency pointers 770. A list of pointers to adjacent antenna coordinates. Adjacent antenna coordinates are not necessarily adjacent in Cartesian space. Regions that are adjacent to the current antenna coordinate in antenna space may be discovered by tracking packet-emitting devices at a sufficient rate as they move through a current antenna coordinate. A block of 30 adjacency pointers is provided, to allow for up to 30 adjacent antenna coordinates. The number 30 roughly corresponds to the number of points that surround any Cartesian coordinate (26) in three-dimensional space. In some examples, adjacency pointers may be associated with their own learning values.

Adjacency block pointer 780. A pointer to an adjacent block 770 of adjacency pointers. Allows for tracking of adjacent groups of antenna coordinates.

One should appreciate that some of the data in data field 640 may be empty. For example, if no SLAM data is received, there would be no SLAM centroid 730. Thus, fields are populated based on availability.

Each of the centroids 710, 720, and 730 is preferably based on a running average, which may be computed from its respective count as follows:

$$\text{new centroid} = \frac{1}{\text{count}} * \text{measurement} + \frac{(\text{count} - 1)}{\text{count}} * \text{centroid}.$$

In an example, each count starts at one and increases by one after every refinement. Each count is preferably capped at a predetermined maximum value to ensure that slow changes in the centroid may be tracked over time.

In some examples, the server apparatus 150 checks IMU measurements for validity before including them in the IMU centroid 720. For example, IMU measurements may be subject to drift, and the use of IMU measurements may rely on regular docking or registration of devices to fixed locations having known Cartesian coordinates.

As indicated, an antenna coordinate may be deleted when its learning value 740 falls to a predetermined lower limit, such as zero. In cases where fingerprints are used, deletion of an antenna coordinates affects only the particular sub-entry that has been aged out. Other sub-entries for other fingerprints have their own learning values 740 and age out separately. Deletion of an antenna coordinate consequent to its learning value 740 falling to zero thus results in deletion of that sub-entry, but not the entire entry 170, unless it is the only sub-entry remaining.

In an example, aging out an antenna coordinate also affects its adjacencies. For example, when the antenna coordinate in sub-entry 170*b* is aged out, all the adjacencies listed in adjacency pointers 770 of data 640*b* are accessed, and the adjacency pointers that point back to the antenna coordinate to be deleted are removed.

FIG. 8 shows an example of multiple adjacent antenna coordinates 810 distributed across multiple Cartesian coordinates 820. Here, it is apparent that the relationship between antenna coordinates 810 and Cartesian coordinates 820 is not one-to-one.

FIG. 9 shows example coextensive antenna coordinates 910, which are distinct antenna coordinates 172 that share the same Cartesian coordinate 820. The data store 160 provides separate entries 170 and/or sub-entries for the coextensive antenna coordinates 910.

Figure 10:
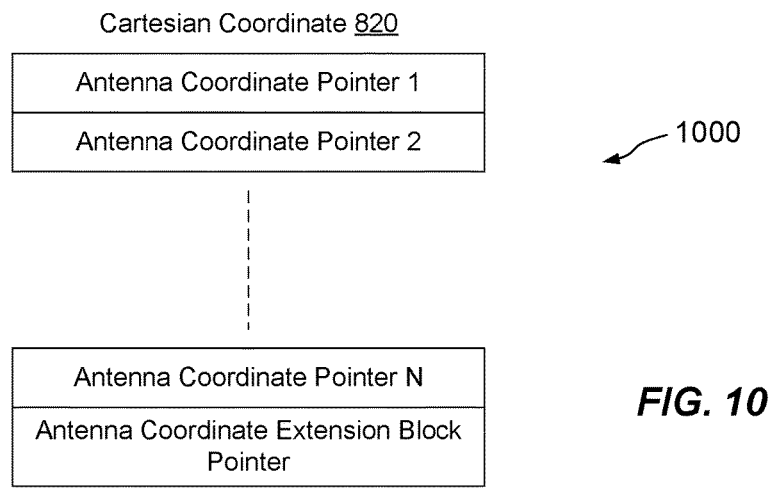
FIG. 10 is a diagram of an example list of pointers to coextensive antenna coordinates that share the same Cartesian coordinate.

FIG. 10 shows an example list 1000 of pointers to coextensive antenna coordinates 910. The list 1000 is organized by Cartesian coordinate 820, such that all the pointers on the list 1000 are coextensive to a single Cartesian coordinate 820. The list 1000 may include any number of elements and may be extendable. Here, information is arranged by Cartesian coordinate, rather than by antenna coordinate as in FIGS. 5-7. In an example, coextensive coordinates are organized in a three-dimensional array, which may be indexed by Cartesian coordinates (x, y, z). The server apparatus 150 may access the list 1000 to age out coextensive coordinates.

For example, each time an antenna coordinate is visited, i.e., by a packet-emitting device passing through the antenna coordinate, the server apparatus 150 looks up the corresponding Cartesian coordinate 820, i.e., in an entry 170 in the data store 160. The server apparatus 150 then performs a look-up into the list 1000 for that corresponding Cartesian coordinate 820 and proceeds to age out all of the other antenna coordinates pointed to by the list 1000. The visited antenna coordinate itself is not aged out at this time. Rather, only the antenna coordinates that are coextensive to the one being visited are aged out. Aging out in this context involves decrementing the learning value 740 of the coextensive coordinate by a predetermined amount. Such aging out has the effect of accelerating the aging of antenna coordinates that may no longer be valid. For example, if an antenna coordinate is coextensive because it reflects a previous arrangement of furniture that is no longer in place, one would want that coextensive coordinate to disappear quickly from the list 1000, as it no longer reflects a valid state of affairs. It should be noted that aging of coextensive antenna components is separate from the time-based aging described in connection with FIG. 7, although both types of aging affect the learning value 740.

Figure 11:
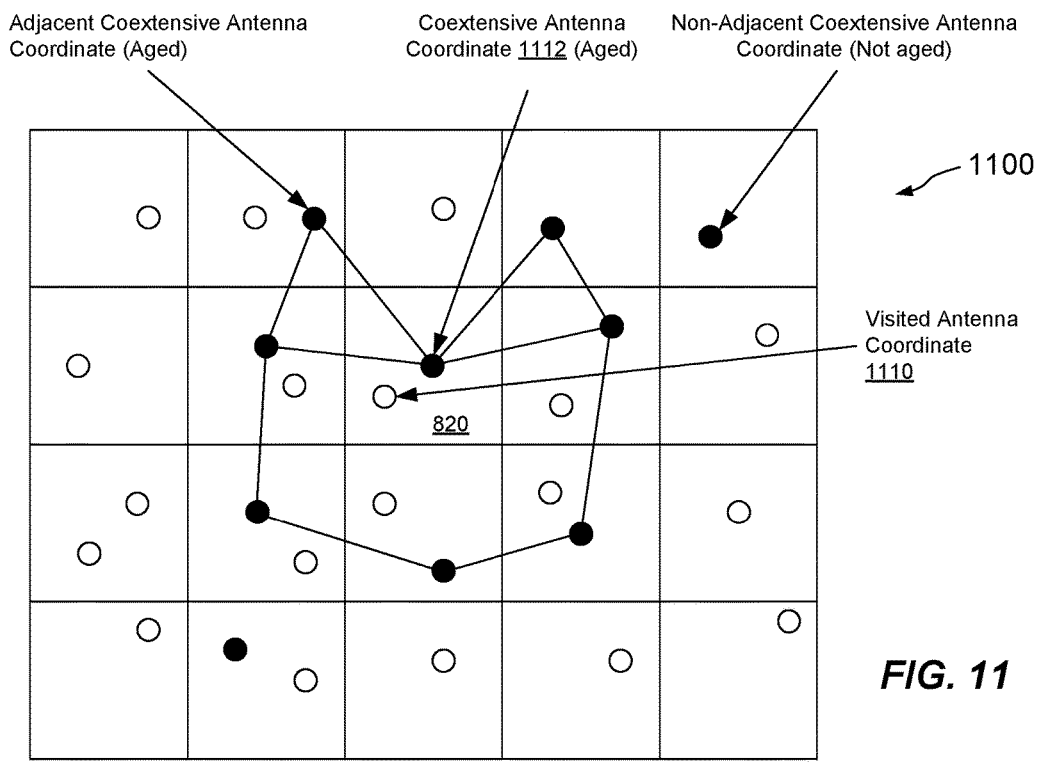
FIG. 11 is a diagram showing an example volume of Cartesian coordinates including a coextensive antenna coordinate and adjacencies.

FIG. 11 shows an arrangement for further accelerating the aging of coextensive antenna coordinates. Here, a volume 1100 of Cartesian coordinates (shown as an area for ease of illustration) surrounds the Cartesian coordinate 820, i.e., the Cartesian coordinate that corresponds to the visited antenna coordinate 1110. When aging out a coextensive coordinate 1112, e.g., by virtue of it appearing on the list 1000, the server apparatus 150 also checks for adjacencies to the coextensive coordinate 1112 within the volume 1100 and ages out those adjacencies. For example, the server apparatus 150 iterates through the block of adjacency pointers 770 in the entry for the coextensive coordinate 1112, accesses the entry for each pointed-to adjacency, checks whether that adjacency corresponds to a Cartesian coordinate in the volume 1100, and, if so, ages out the adjacency by decrementing its learning value 740.

Figure 12:
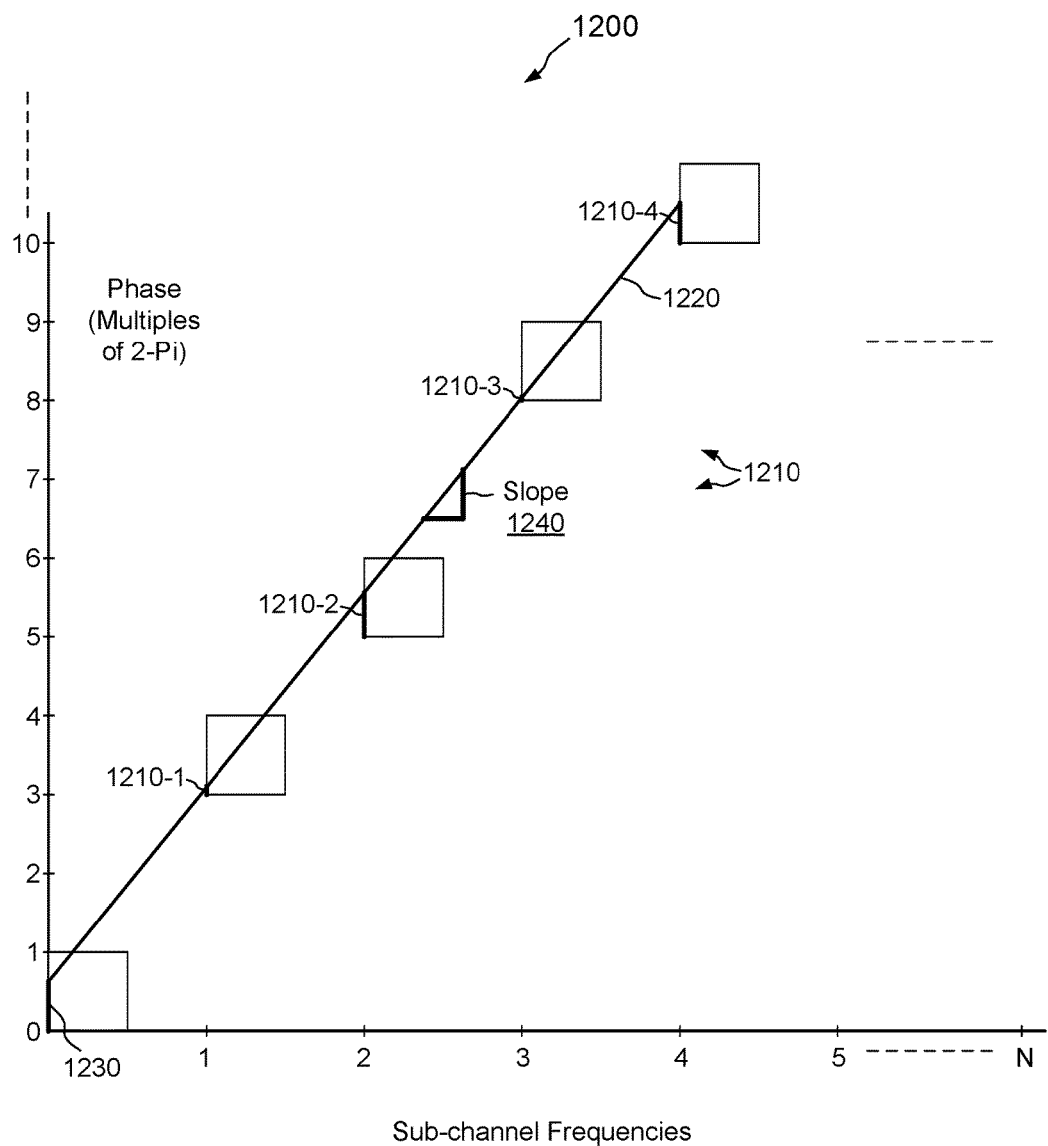
FIG. 12 is a graph of unwrapped CSI (channel state information) phase information versus sub-channel frequency.

FIG. 12 shows an example graph 1200 of unwrapped CSI phase versus sub-channel frequency. In an example, the graph 1200 is generated by a WAP 140 in response to that WAP 140 receiving a wireless packet at one of its antennas 410, such as the apex antenna 410*a*. The graph shows phase as measured by multiple Wi-Fi sub-channels, which are labeled 1–N, where "N" is the number of sub-channels. Some implementations represent sub-channels from –N/2 to N/2. This is merely a convention, however. Multiple phase measurements 1210-1 through 1210-4 (collectively, 1210) are shown, with the line in each illustrated square representing a phase measurement. A phase 1230 of the 0-th sub-channel is not directly measured but is rather inferred from other phase data.

As is known, Wi-Fi transmitters may be configured to break up a packet into smaller pieces and to transmit each packet piece on a different sub-channel. The resulting phase values reflect detections of packet pieces by sub-channel receivers in the WAP 140 and are referenced to the WAP's clock, which may operate at approximately 5.4 GHz.

CSI in the WAP 140 may provide phase values 1210 in wrapped form, i.e., modulo-2-Pi, where 2-Pi represents a complete period of the WAP's clock. In an example, the WAP 140 performs a phase unwrapping operation to restore the absolute phase data. The graph 1200 shows the result of phase unwrapping. From the unwrapped phase, a line 1220 may be constructed as a best-fit to the phase values, and a slope 1240 of the line 1220 provides a value for mixed ToF, which is precisely the quantity indicated above for use as a spatial invariant.

Given the constraints of measurement, the slope 1240 should evaluate to an integer. The WAP 140 may round a calculated slope to the nearest integer if the calculated slope has a fractional part. The resulting integer value provides a coordinate component for the WAP 140, i.e., one of n1, n2, or n3.

Accuracy in measuring mixed ToF depends upon the WAP 140 having a fixed or at least measurable packet detection delay. This characteristic is believed to be found in certain commercial Wi-Fi products, such as those available from Celeno Communications (www.celeno.com).

Although various methodologies for phase unwrapping are known, a particular approach has been developed for the circumstances herein and is not known to have been used previously. This approach may be conducted as follows:

As a matter of notation, we call "offset" the number of $2\pi$ jumps between consecutive phase samples, i and i+1, and denote this by O(i). Of particular importance is $O_{min}=\min_i O(i)$. We shall call "wrap count" the number of $2\pi$ jumps measured from 0 and denote this by W(i). $\psi(i)$ is the wrapped phase of the i'th sub-channel and $\theta(i)$ is the unwrapped phase of the i'th sub-channel. Therefore $\theta(i)=\psi(i)+2\pi W(i)$.

Recursion is initialized by setting $\theta(1)=\psi(1)$.

If $\psi(2) \geq \psi(1)$, then $\theta(2)=\psi(2)$. Else $\theta(2)=\psi(2)+2\pi$.

$\theta(3)$ is a critical element for the initialization, as it is in this step that a very good rough estimate of the final line 1220 will be generated. To create $\theta(3)$ we first follow the procedure performed to create $\theta(2)$.

Then a line is created passing through $\theta(1)$ and $\theta(3)$, which we call $\Theta(j)$.

If $|\Theta(2)-\theta(2)|<\in$ then we are done and perform a least squares estimate to get the best linear estimate of the 3 points.

If $|\Theta(2)-\theta(2)| \geq \in$ then we bump up $\theta(3)$ by $2\pi$. A new line $\Theta(j)$ is created passing through $\theta(1)$ and the new $\theta(3)$. We check to see if $|\Theta(2)-\theta(2)|<\in$, if not then $\theta(2)$ is bumped up by $2\pi$ and we check again.

We repeat this process of increasing $\theta(3)$, creating a new $\Theta(j)$ and attempting to find a $\theta(2)$ that satisfies $|\Theta(2)-\theta(2)|<\in$.

Since the slope 1240 is bounded and the data is linear, O(i) is bounded by a relatively small number. We would need to check at most 2*max(O(i)) of possible values of $\theta(3)$ before a solution is found. Once the values are found a least squares fit is performed on the 3 points to get the best possible estimate of the line.

The recursive step is as follows. If $|(\psi(i)+2\pi(W(i-1)+O_{min}))-\Theta(i)|<\in$ then we keep the line $\Theta(i)$ and set $\theta(i)=+\psi(i)+2\pi(W(i-1)+O_{min})$.

If $|(\psi(i)+2\pi(W(i-1)+O_{min}))-\Theta(i)| \geq \in$ then we bump up $\theta(i)$ by $2\pi$ and check if $|\theta(i)-\Theta(i)|<\in$.

One of these tests must pass else the original data is not linear. To correct we perform a least squares on the first i−1 samples to create a new $\Theta(i)$ and then rerun for $\theta(i)$. The recursive step is performed in this manner to minimize the number of least squares estimates performed during the execution of this algorithm.

For this algorithm to work, each least squares estimate of the line $\Theta(i)$ must be able to successfully predict at least one $\theta(i)$.

For the missing center sub-channels we simply jump to the next valid sub-channel and increase by a factor of $O_{min}$ where the factor is equal to the number of missing sub-channels plus one.

This algorithm assumes that the noise in the data is low and thus E is quite small. This assumption is valid for functioning WiFi.

Figures 13A, 13B:
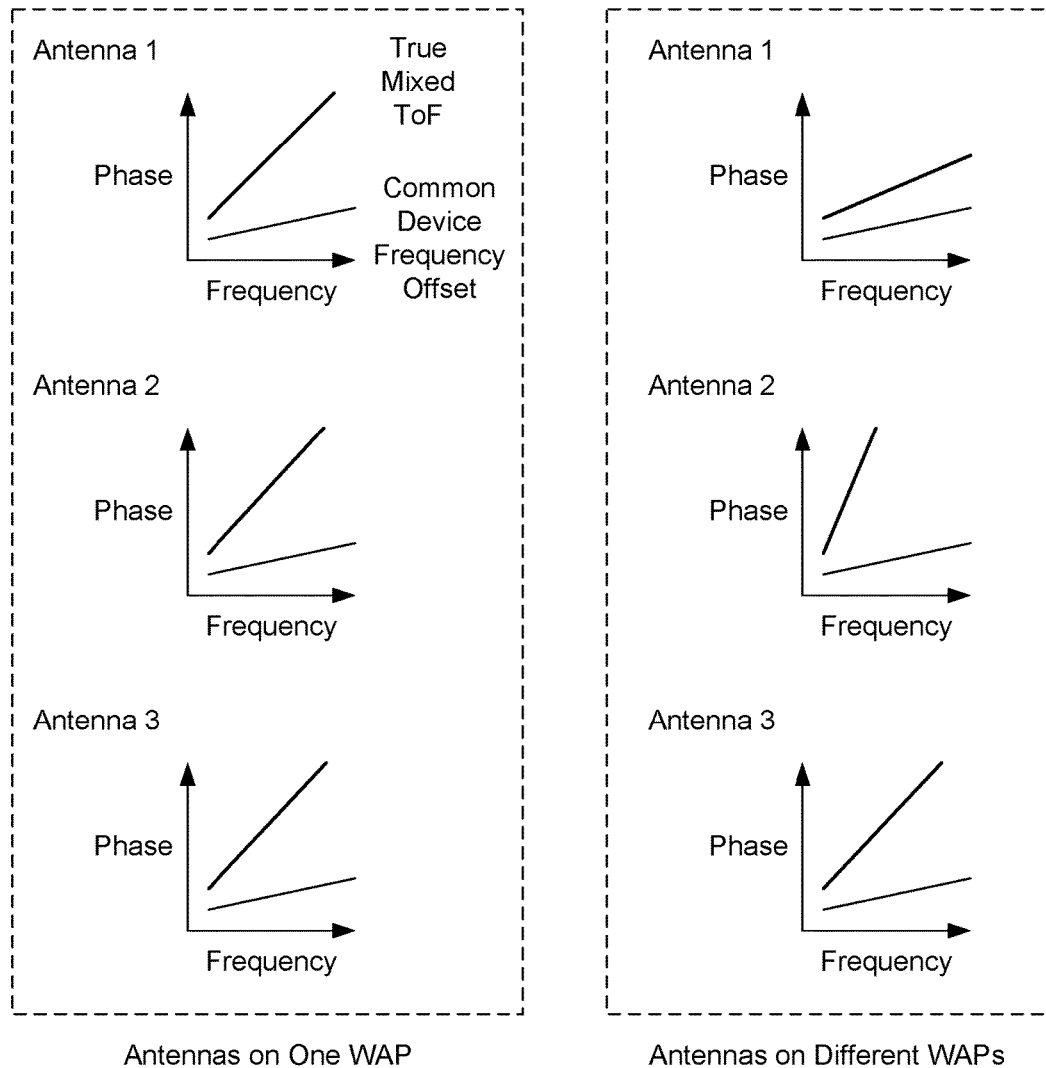
FIGS. 13A and 13B are sets of graphs that contrast (A) identifying a common device phase offset from antennas within a WAP from (B) identifying a common device phase offset from antennas on different WAPs.

FIGS. 13A and 13B show an example arrangement for correcting frequency offset errors in WAPs 140. As is known, frequency errors (or, equivalently, phase errors) may arise as a result of Wi-Fi clocks on different equipment running at slightly different frequencies. Frequency offset appears as a linear component of unwrapped CSI phase and thus has a direct impact on measurements of slope 1240.

To correct for device frequency offset, data is used from multiple paths for the same transmitted packet. The bigger the difference in the path lengths, the better the device frequency offset error can be corrected. One way to obtain multiple paths is to perform the MUSIC algorithm on CSI from a WAP 140 to get the various paths that the packet traversed. The problem with this method is time–MUSIC is an expensive algorithm to run in terms of execution time. If synchronized to a common timing reference 450 (FIG. 4B), the WAPs 140 can share the same frequency. Thus, one can use the WAPs 140 to get different paths and thus avoid using MUSIC in most cases. Each WAP 140 sends it unwrapped CSI data to the server apparatus 150, and the server apparatus 150 uses those three paths to correct for device frequency offset, identifying the correction using EQ. 1 below.

A corner case may arise when one or more of the coordinate components from the WAPs 140 is the same or very close. In that case, MUSIC may have to be run to decompose at least one of the WAP's CSI to get different paths. Once different paths are generated, the device frequency offset is corrected by applying EQ. 1, where M and m represent antennas 410 and N and n represent sub-channels:

$$\tau = \mathrm{argmin}_\rho \Sigma_{m,n}^{M,N} (\psi(m,n)+2\pi f_\delta(n-1)\rho+\beta)^2. \quad (\mathrm{EQ.~1})$$

Here, $\psi$ represents phase, $\rho$ is the slope of the line, $\beta$ is the offset of the line, and $f_\delta$ is the frequency difference between adjacent sub-channels.

FIGS. 13A and 13B allow one to visualize how the above equation determines the device frequency offset, by breaking up the measured time of flight data into a true time of flight and device phase offset caused by frequency offset. The measured time of flight is the sum of the two. When the paths are different, as is the normal case for antennas 410 on different WAPs 140 (FIG. 13B), then the common part is easily removed via the above equation. With antennas 410 on the same WAP 140 (FIG. 13A), the paths are not sufficiently different to guarantee that the equation will distinguish the common part.

For wearable devices, such as those used in games, the frequency offset need not be calculated each time a packet is detected. It is envisioned that those devices will run solely on the control channel and hence their frequency will never be switched. For this reason their frequency will not change very fast, and phase correction need only be run infrequently.

Other devices may typically switch frequencies every time they send a locator packet. Hence, one cannot guarantee that a device's frequency will be the same for consecutive packets. For this reason, these other devices may require frequency correction for each packet.

As of the time of this writing, it is understood that efforts are underway to correct phase offset error automatically in commercial Wi-Fi chips. Thus, it may not be necessary to remove such errors using the methodology described above, as manufacturers may already have provided features for removing the error themselves.

Figure 14:
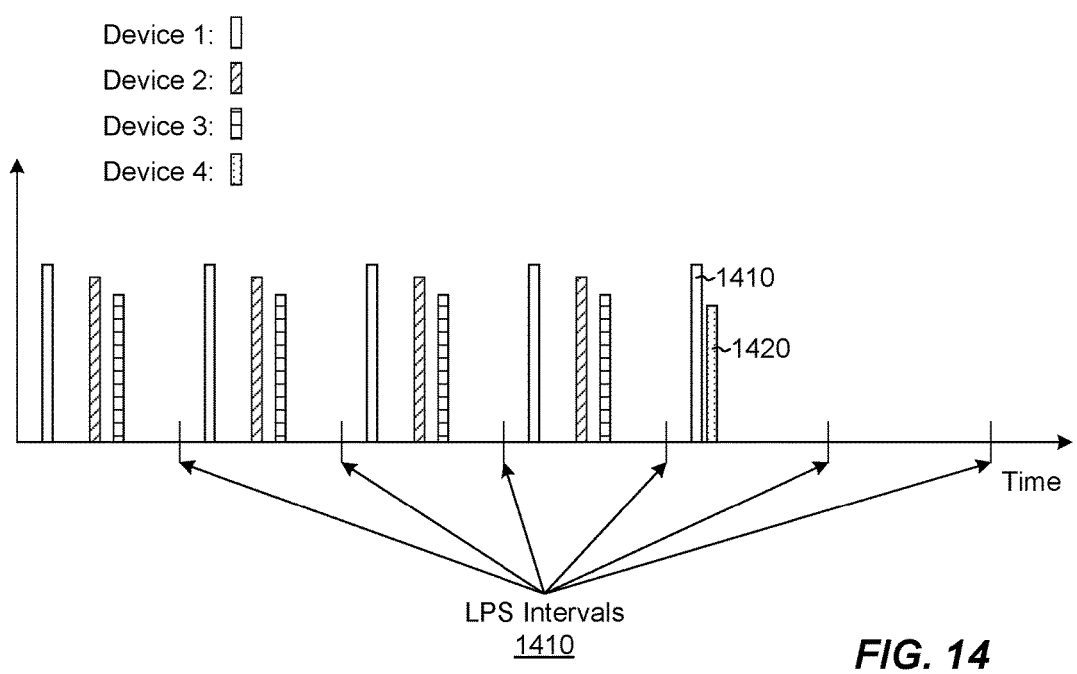
FIG. 14 shows an example arrangement for self-channelization of locator packets emitted by different devices.

FIG. 14 shows an example network optimization for promoting consistency in the timing of locator packets. To accurately track device locations and adjacencies as devices move through the physical space 110, moving devices must emit locator packets on a regular basis, such as 64 packets per second for each device, assuming an antenna coordinate spacing of approximately 6 cm and a maximum movement rate of approximately 3.8 m/s. As it is expected that many devices may operate at the same time in the physical space 110, optimization of the network may be desired to ensure that device tracking is continuous within the measurement granularity of the system.

One optimization is to provide a dedicated Wi-Fi channel for locator packets. According to this optimization, each participating device is configured to use the dedicated channel when sending its locator packets. Although this optimization results in a potentially large number of devices using the same Wi-Fi channel, it is nevertheless effective as locator packets are generally very small, having little or no payload.

Another optimization is to establish a common period, shown as LPS intervals 1410. The common period may be set based on the desired transmission rate of locator packets, e.g., at 1/64 second. Here, each participating device is configured to transmit locator packets only at a particular time relative to the common period, such as at some number of milliseconds relative to a start of the common period. If a device attempting to send a locator packet detects a collision, the device may retry. The issue of latency remains, however, as standard packet retry times tend to be very long.

Accordingly, yet another optimization is to configure participating devices to have shorter retry times. For example, devices may be programmed with packet retry times that are greater than typical packet transmission times but less than the common period. In some examples, devices are programmed to select random retry times between these limits. With this arrangement, a device experiencing a packet collision will retry the packet shortly thereafter, but still generally within a sufficiently short amount of time that enables the packet to be used. Assuming no collision is detected when attempting to retry the packet, the device continues to transmit locator packets at the same time relative to the common period as the one used when retrying the packet. In this manner, devices tend to self-channelize, as they tend to settle on particular times relative to the common period for sending their locator packets. Most collisions are thus avoided going forward.

In the example of FIG. 14, devices 1-3 have self-channelized. Device 4 comes online and attempts to send a locator packet, but tries to send during the interval 1410 when device 1 is sending, and thus encounters a collision. Device 4 then retries a short time later, during interval 1420. No conflict is detected, so device 4 continues sending locator packets at the same time relative to the common period.

Figure 15:
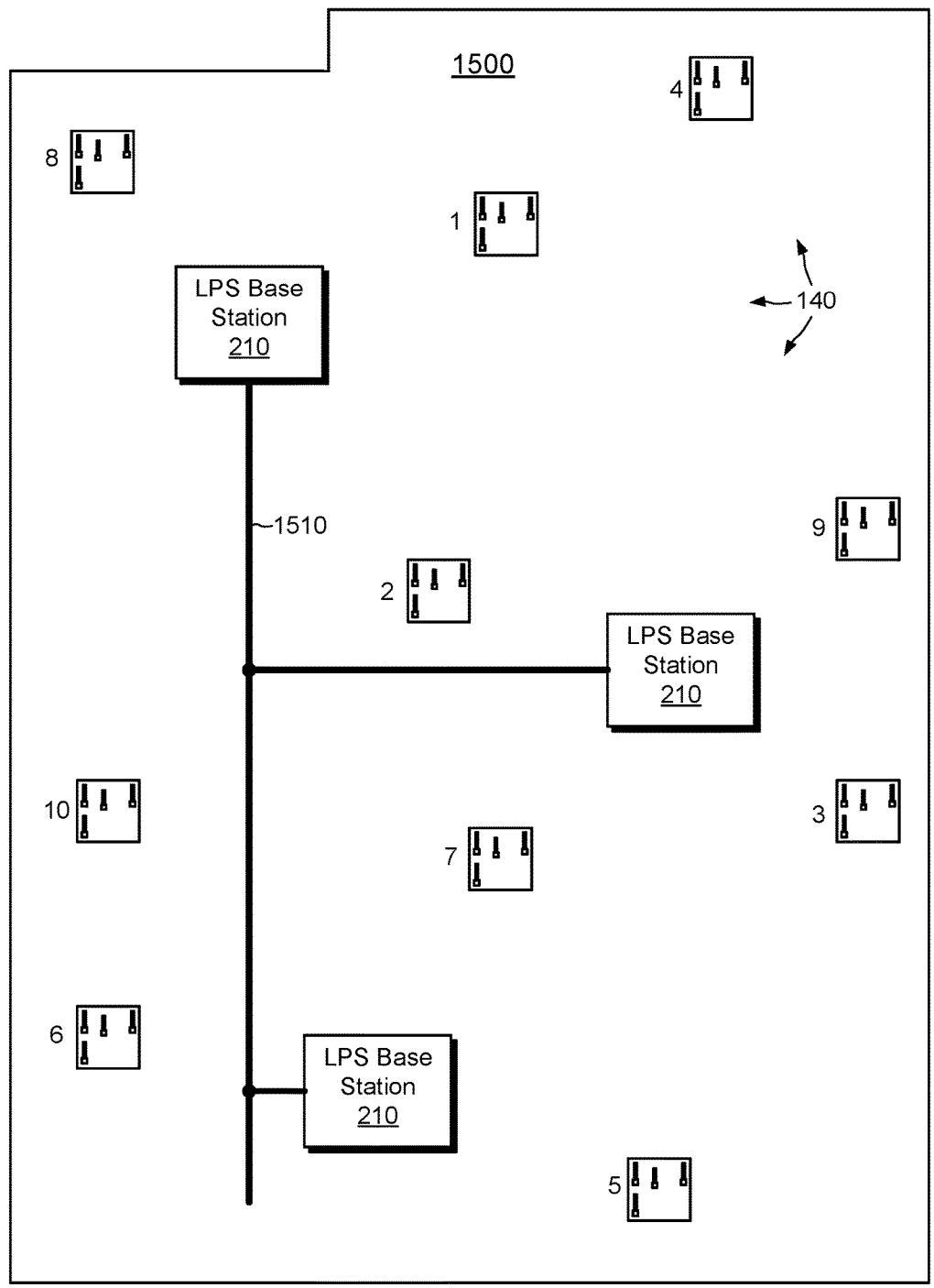
FIG. 15 is a top plan view of an example large physical space having a arbitrarily large number of WAPs and multiple base stations securely networked together.

FIG. 15 shows an example system in which an arbitrarily large number of antenna units 140 and LPS base stations 210 are used in a large physical space 1500, such as a mall, convention center, or other large space. The system of FIG. 15 may be configured in various ways. In one example, each LPS base station 210 is associated with a respective set of antenna units 140, e.g., in the same manner as described in connection with FIG. 1. Each LPS base station 210 maintains its own data store 160, or data stores for the different LPS base stations 210 may be merged. The LPS base stations 210 are connected together using a secured network 1510. In some examples, the secured network 1510 is realized in the form of a secure spanning tree, an example of which is disclosed in the above-incorporated U.S. application Ser. No. 15/452,451, filed Mar. 7, 2017.

In another example, a single LPS base station 210 is provided but there are an arbitrarily large number of antenna units 140. The antenna units are arranged in a priority list, with each antenna unit 140 having a rank in the priority list. FIG. 15 shows an example ranking of antenna units 140, using numerals appearing to the left of each antenna unit 140 to identify its rank. As devices in physical space 1500 emit packets, certain antenna units 140 may receive the packets and others may not. All antenna units 140 that receive the packet send their timing data 242 to the LPS base station 210. The base station 210 checks the priority list and uses the M highest-ranking antenna units 140 that reported the packet to generate the antenna coordinate and signature. Here, M is the number of coordinate components that form an antenna coordinate, which is three in the main examples described above.

Figure 16:
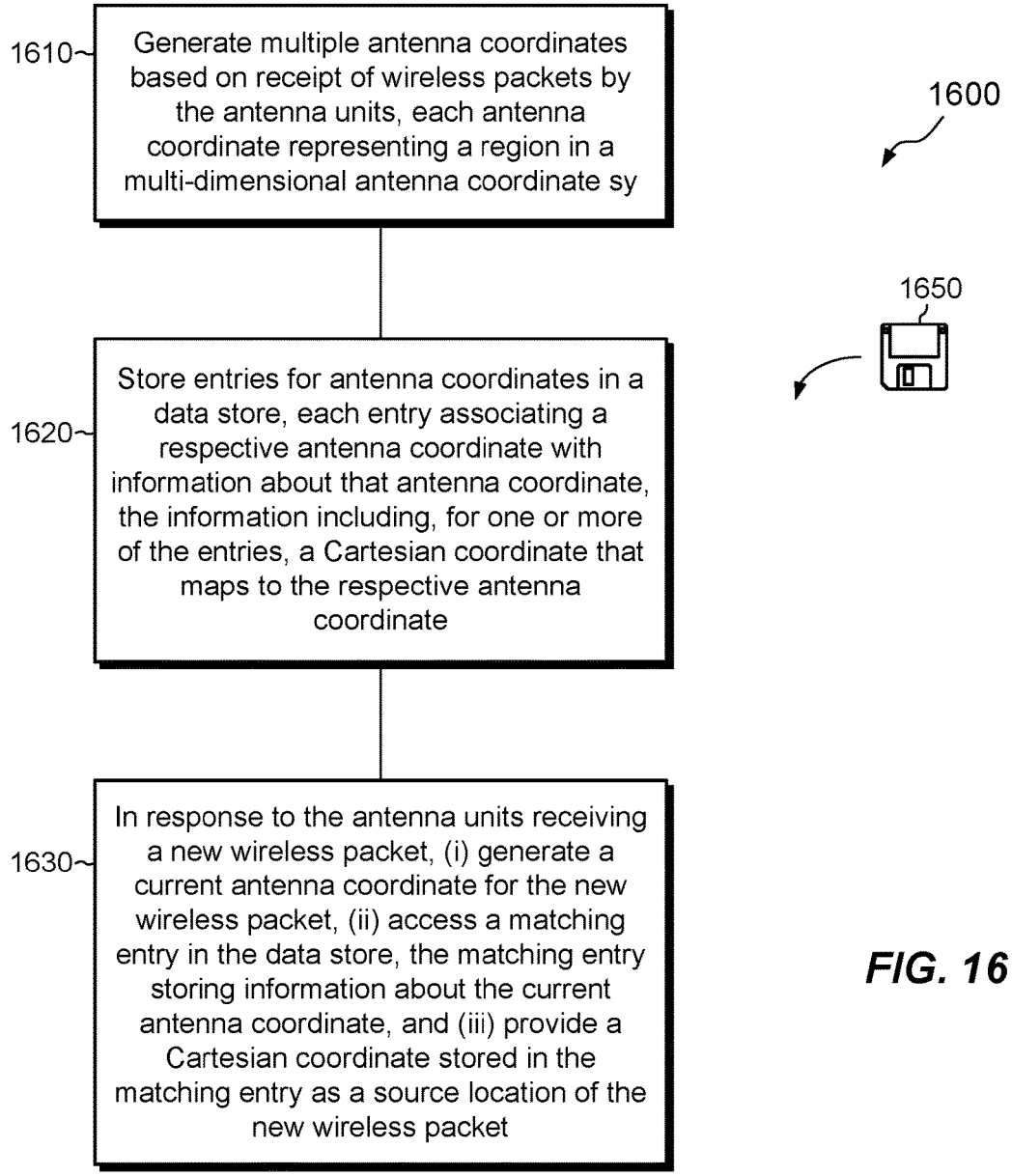
FIG. 16 is a flowchart showing an example method of locating electronic devices in a physical space.

FIG. 16 shows an example method 1600 that may be carried out in connection with the environment 100. The method 1600 is typically performed, for example, by the structures and software constructs described in connection with FIGS. 1-4, which may reside in memory or firmware of the LPS base station 210, antenna units 140, and/or electronic devices 120, and are run by associated processors. The various acts of the method 1600 may be ordered in any suitable way. Accordingly, embodiments may be constructed in which acts are performed in orders different from that illustrated, which may include performing some acts simultaneously.

At 1610, multiple antenna coordinates 172 are generated based on receipt of wireless packets by a system that includes multiple antenna units 140. Each antenna coordinate 172 represents a region in a multi-dimensional antenna coordinate system.

At 1620, entries 170 for antenna coordinates 172 are stored in a data store 160. Each entry 170 associates a respective antenna coordinate 172 with information about that antenna coordinate 172. The information includes, for one or more of the entries 170, a Cartesian coordinate 820 that maps to the respective antenna coordinate 172.

At 1630, in response to the antenna units 140 receiving a new wireless packet, the method further includes (i) generating a current antenna coordinate 172 for the new wireless packet, (ii) accessing a matching entry 170 in the data store 160, the matching entry 170 storing information 640 about the current antenna coordinate 172, and (iii) providing a Cartesian coordinate 820 stored in the matching entry 170 as a source location of the new wireless packet. The method 1600 thereby identifies Cartesian coordinates 820 of sources of wireless packets based on matching of antenna coordinates 172.

Having described certain embodiments, numerous alternative embodiments or variations can be made. For example, although antenna coordinates 172 are shown and described as representing regions in three-dimensional space, they may alternatively be used for mapping locations two-dimensional space. For example, using the principles described above, as few as two WAPs 140 may be used to locate devices in two-dimensional space.

Further, although embodiments have been described in connection with games and security applications, one should appreciate that embodiments are not limited to such applications and may be used in any application that could benefit from fast and accurate location measurements.

Further still, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 1650 in FIG. 16). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of locating electronic devices in a physical space, the method comprising:
    generating multiple antenna coordinates based on receipt of wireless packets by a system that includes multiple antenna units, each antenna coordinate based on timing information from the antenna units and representing a region in a multi-dimensional antenna coordinate system whose dimensions are denominated in non-spatial units;
    storing entries for antenna coordinates in a data store, each entry associating a respective antenna coordinate with information about that antenna coordinate, the information including, for one or more of the entries, a Cartesian coordinate that maps to the respective antenna coordinate, the Cartesian coordinate belonging to a Cartesian coordinate system whose dimensions are denominated in non-spatial units; and
    in response to the antenna units receiving a new wireless packet, (i) generating a current antenna coordinate for the new wireless packet, (ii) accessing a matching entry in the data store by applying the current antenna coordinate as a set of lookup indices into the data store, the matching entry storing information about the current antenna coordinate, and (iii) providing a Cartesian coordinate stored in the matching entry as a source location of the new wireless packet,
    the method thereby identifying Cartesian coordinates of sources of wireless packets based on matching of antenna coordinates.

2. The method of claim 1, wherein generating the current antenna coordinate includes forming the current antenna coordinate as an ordered set of coordinate components, each coordinate component based on data provided by a respective one of the antenna units.

3. The method of claim 2, wherein the coordinate components forming the current antenna coordinate are integers, such that the current antenna coordinate is formed as an ordered set of integers.

4. The method of claim 3, further comprising organizing entries in the data store for antenna coordinates in a multi-dimensional array, wherein antenna coordinates provide multi-dimensional indices into the array.

5. The method of claim 2, further comprising generating, by an antenna unit of the system in response to that antenna unit receiving a wireless packet, timing data that describes a spatial invariant of the physical space.

6. The method of claim 5, wherein generating the timing data includes generating a mixed ToF (time-of-flight) of the wireless packet as the spatial invariant, the mixed ToF representing a multi-path propagation of the wireless packet from a transmitting location to the antenna unit.

7. The method of claim 6, wherein generating the mixed ToF is based on phase information obtained across multiple Wi-Fi subchannels as provided in CSI (channel state information) from the antenna unit.

8. The method of claim 7, wherein generating the mixed ToF includes rendering the mixed ToF as an integer, the integer based on a slope of a line that relates Wi-Fi subchannels to unwrapped CSI phase.

9. The method of claim 8, wherein generating the mixed ToF includes correcting a frequency offset error in the mixed ToF.

10. The method of claim 6, wherein each of the antenna units is realized as a WAP (wireless access point), each WAP including four antennas arranged at corners of a cube, one of the antennas in the WAP being an apex antenna that is adjacent to the other three antennas, wherein generating the mixed ToF as a coordinate component is based on measurements from only one of the antennas in the WAP, and wherein the method further comprises generating a mixed AoA (angle-of-arrival) of the wireless packet based on measurements by all four antennas in the WAP.

11. The method of claim 10, further comprising:
    generating a fingerprint as an ordered set of mixed AoA values of the wireless packet as across as generated by the WAPs;
    storing the fingerprint in the entry for the antenna coordinate, the antenna coordinate and the fingerprint together uniquely identifying a region in physical space.

12. The method of claim 2, further comprising training Cartesian coordinates to corresponding antenna coordinates based on repeated measurements of locations from which packets are emitted.

13. The method of claim 12, wherein the Cartesian coordinate stored in the entry for the current antenna coordinate is provided as a centroid of the current antenna coordinate, and wherein the method further comprises:
    updating the centroid to reflect an average of multiple location measurements made on respective visits to the current antenna coordinate, each visit occurring when a respective wireless packet received by the antenna units results in generation of an antenna coordinate that matches the current antenna coordinate.

14. The method of claim 13, wherein each of the location measurements is based on at least one of (a) an IMU (inertial measurement unit) measurement made by a device, (b) a SLAM (simultaneous localization and mapping) measurement made by a device, and (iii) a calculation of location based on information received from the antenna units.

15. The method of claim 13, further comprising:
discovering a set of adjacent antenna coordinates that are adjacent to the current antenna coordinate by monitoring antenna coordinates generated consecutively in time in response to one or more packet-emitting devices moving through the current antenna coordinate in the physical space; and
storing, in the entry for the current antenna coordinate in the data store, a set of pointers to the set of adjacent antenna coordinates.

16. The method of claim 15, further comprising, when storing a pointer to an adjacent antenna coordinate:
accessing an entry for the adjacent antenna coordinate in the data store; and
storing a pointer to the current antenna coordinate in the entry for the adjacent antenna coordinate.

17. The method of claim 16, further comprising;
maintaining a learning value in the entry for the current antenna coordinate, the learning value indicating a strength of association between the current antenna coordinate and the centroid;
increasing the learning value in response the centroid being updated with a new location measurement;
decreasing the learning value on a regular basis by a predetermined amount; and
deleting the current antenna coordinate from the data store in response to the learning value reaching a predetermined lower limit.

18. The method of claim 17, wherein, when deleting the current antenna coordinate, the method further comprises removing the pointer to the current antenna coordinate from the entry for the adjacent antenna coordinate.

19. The method of claim 17, further comprising:
maintaining a list of pointers to respective coextensive antenna coordinates, the coextensive antenna coordinates having antenna coordinates described in respective entries of the data store and sharing a common Cartesian coordinate; and
in response to detecting that one of the coextensive antenna coordinates has been visited, decreasing a learning value of each of the other coextensive antenna coordinates identified in the list of pointers.

20. The method of claim 19 wherein, when decreasing the learning value of a particular coextensive antenna coordinate, the method further comprises:
identifying a set of adjacent antenna coordinates of the particular coextensive antenna coordinate within a predetermined physical volume around the particular coextensive antenna coordinate; and
decreasing a respective learning value of each of the set of identified adjacent antenna coordinates.

21. The method of claim 2, further comprising configuring a set of devices to transmit locator packets exclusively over a particular Wi-Fi channel, each locator packet being a Wi-Fi packet that initiates generation of an antenna coordinate.

22. The method of claim 21, further comprising:
configuring the set of devices to transmit locator packets relative to a common period, such that each of the set of devices transmits locator packets at a respective time relative to the common period unless there is a packet collision; and
configuring the set of devices to establish a packet retry time that is greater than a packet transmission time and less than the common period.

23. The method of claim 22, further comprising selecting the packet retry time on a per-device basis as a random value between the packet transmission time and the common period.

24. The method of claim 2, wherein the antenna units form a first set of antenna units operatively coupled to a base station, and wherein the method further comprises:
providing multiple sets of antenna units, each set of antenna units coupled to a respective base station; and
operatively connecting the base stations via a secured network.

25. The method of claim 2, further comprising:
providing a plurality of antenna units in the physical space and a base station;
providing a priority list of antenna units that indicates a relative ranking of antenna units;
receiving, by the base station, data for providing coordinate components from a set of the plurality of antenna units;
selecting, by the base station, a set of M highest ranking antenna units from among the set of antenna units; and
generating, by the base station, an antenna coordinate based on the data received from the M highest ranking antenna units,
wherein M is the number of coordinate components that form an antenna coordinate.

26. The method of claim 2, wherein the antenna units include multiple WAPs (wireless access points), each WAP including multiple antennas, and wherein generating the current antenna coordinate includes forming the current antenna coordinate based on input from no greater than three WAPs.

27. An electronic system for locating electronic devices in a physical space, the electronic system comprising a base station coupled to multiple WAPs (wireless access points), each WAP including multiple antennas, the base station including control circuitry constructed and arranged to:
generate multiple antenna coordinates based on receipt of wireless packets, each antenna coordinate (i) generated based on timing information from measurements made by no greater than three WAPs and (ii) representing a region in a multi-dimensional antenna coordinate system whose dimensions are denominated in non-spatial units;
store entries for antenna coordinates in a data store, each entry associating a respective antenna coordinate with information about that antenna coordinate, the information including, for one or more of the entries, a Cartesian coordinate that maps to the respective antenna coordinate, the Cartesian coordinate belonging to a Cartesian coordinate system whose dimensions are denominated in non-spatial units; and
in response to a new wireless packet, (i) generate a current antenna coordinate for the new wireless packet, (ii) access a matching entry in the data store by applying the current antenna coordinate as a set of lookup indices into the data store, the matching entry storing information about the current antenna coordinate, and (iii) provide a Cartesian coordinate stored in the matching entry as a source location of the new wireless packet.

28. A computer program product including a set of non-transitory, computer-readable media that store instructions which, when executed by control circuitry of an electronic system, cause the electronic system to perform a method of locating electronic devices in a physical space, the method comprising:

generating multiple antenna coordinates based on receipt of wireless packets by a system that includes multiple antenna units, each antenna coordinate based on timing information from the antenna units and representing a region in a multi-dimensional antenna coordinate system whose dimensions are denominated in non-spatial units;

storing entries for antenna coordinates in a data store, each entry associating a respective antenna coordinate with information about that antenna coordinate, the information including, for one or more of the entries, a Cartesian coordinate that maps to the respective antenna coordinate, the Cartesian coordinate belonging to a Cartesian coordinate system whose dimensions are denominated in spatial units; and in response to the antenna units receiving a new wireless packet, (i) generating a current antenna coordinate for the new wireless packet, (ii) accessing a matching entry in the data store by applying the current antenna coordinate as a set of lookup indices into the data store, the matching entry storing information about the current antenna coordinate, and (iii) providing a Cartesian coordinate stored in the matching entry as a source location of the new wireless packet, the method thereby identifying Cartesian coordinates of sources of wireless packets based on matching of antenna coordinates.

* * * * *